(12) United States Patent
Smith

(10) Patent No.: US 10,829,322 B1
(45) Date of Patent: Nov. 10, 2020

(54) DEVICE AND METHOD FOR UNLOADING BULK MATERIALS FROM A VEHICLE

(71) Applicant: Owens-Brockway Glass Container Inc., Perrysburg, OH (US)

(72) Inventor: David W Smith, Woodland, WA (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 241 days.

(21) Appl. No.: 15/879,226

(22) Filed: Jan. 24, 2018

(51) Int. Cl.
*B65G 69/18* (2006.01)
*B61D 7/02* (2006.01)
*B60P 1/56* (2006.01)

(52) U.S. Cl.
CPC ............... *B65G 69/18* (2013.01); *B60P 1/56* (2013.01); *B61D 7/02* (2013.01)

(58) Field of Classification Search
CPC ........ B65G 69/185; B65G 69/18; B61D 7/02; B61D 7/32; B60P 1/56
See application file for complete search history.

(56) References Cited

U.S. PATENT DOCUMENTS

| | | | |
|---|---|---|---|
| 3,405,820 A | 10/1968 | Mori | |
| 3,528,570 A * | 9/1970 | Pase | B61D 7/30 414/376 |
| 3,885,606 A | 5/1975 | Krauss | |
| 3,951,278 A * | 4/1976 | Pase | B61D 7/32 414/572 |
| 3,997,089 A * | 12/1976 | Clarke | B60P 1/56 222/545 |
| 4,252,493 A | 2/1981 | Ilse | |
| 4,324,524 A | 4/1982 | Burston et al. | |
| 4,699,187 A * | 10/1987 | Binzen | B65G 69/186 141/5 |
| 5,069,723 A | 12/1991 | Cole, Jr. et al. | |
| 5,290,139 A | 3/1994 | Hedrick | |
| 5,893,399 A | 4/1999 | Kearney | |
| 6,156,087 A | 12/2000 | Hydes | |
| 8,308,415 B2 * | 11/2012 | Schmid | B61D 7/32 254/89 H |
| 8,857,481 B2 | 10/2014 | Aviles et al. | |
| 9,340,353 B2 * | 5/2016 | Oren | B65D 90/587 |
| 9,358,988 B2 * | 6/2016 | Early | B61D 7/02 |

FOREIGN PATENT DOCUMENTS

| | | |
|---|---|---|
| JP | 63074822 A | 4/1988 |
| JP | 11070996 A | 3/1999 |

OTHER PUBLICATIONS

English language abstract for Japanese Pub. No. 11070996.
English language abstract for Japanese Pub. No. 63074822.

* cited by examiner

*Primary Examiner* — Jonathan Snelting

(57) ABSTRACT

A device is provided for transferring bulk materials from a vehicle through a grate to a structure disposed below the grate. The device includes a plate disposed over the grate and defining an opening smaller than the grate. The device further includes a hopper configured to rest on the plate between the plate and the underside of the vehicle. The hopper defines a bottom opening configured for alignment with the opening in the plate and a top opening configured for alignment with a discharge spout on the vehicle and the top opening is larger than the bottom opening. The device further includes means for moving the hopper to an operating position in which the bottom and top openings are aligned with the opening in the plate and the discharge spout on the vehicle.

21 Claims, 3 Drawing Sheets

DEVICE AND METHOD FOR UNLOADING BULK MATERIALS FROM A VEHICLE

BACKGROUND a. Technical Field

This disclosure relates to the transfer of bulk materials from a vehicle such as a truck trailer or a rail car. In particular, the disclosure relates to a device and method for transferring bulk materials from a vehicle through a grate into a structure disposed below the grate such as a bin, hopper, silo or other storage or transfer structure while minimizing dust generated or released during transfer of the bulk materials.

b. Background Art

During the manufacture of finished goods, raw materials used in creating the goods are often moved between various locations within a manufacturing facility. In most manufacturing facilities, the raw materials are first delivered to the facility in bulk by various vehicles (e.g., trucks, trains, ships, etc.) and must be unloaded from the vehicles at the facility. In the case of relatively small, granular bulk materials such as silica sand, soda ash (sodium carbonate), limestone and cullet (recycled broken glass) used in glass manufacturing, unloading the bulk materials from vehicles can generate substantial dust that can escape into the environment.

The inventors herein have recognized a need for a device and method for transferring bulk materials from a vehicle through a grate into a structure disposed below the grate such as a bin, hopper, silo or other storage or transfer structure that will minimize and/or eliminate one or more of the above-identified deficiencies.

BRIEF SUMMARY OF THE DISCLOSURE

This disclosure relates to a device and method for transferring bulk materials from a vehicle through a grate into a structure disposed below the grate such as a bin, hopper, silo or other storage or transfer structure. In particular, the disclosure relates to a device and method that minimize dust generated or released during transfer of the bulk materials to the lower structure. Oftentimes, the structure is located below a floor or ground surface and the grate is located nominally at the floor or ground surface.

A device for transferring bulk materials from a vehicle through a grate to a structure disposed below the grate in accordance with one embodiment includes a plate disposed over the grate and defining an opening smaller than the grate. The device further includes a hopper configured to rest on the plate between the plate and the underside of the vehicle, the hopper defining a bottom opening configured for alignment with the opening in the plate and a top opening configured for alignment with a discharge spout on the vehicle. The top opening is larger than the bottom opening. The device further includes means for moving the hopper to an operating position in which the bottom and top openings are aligned with the opening in the plate and the discharge spout on the vehicle.

A method for transferring bulk materials from a vehicle through a grate to a structure disposed below the grate in accordance with one embodiment includes the step of arranging a plate over the grate. The plate defines an opening smaller than the grate. The method further includes the step of moving a hopper to an operating position between the plate and the vehicle after the vehicle is located over the grate such that the hopper is disposed on the plate, a bottom opening of the hopper is aligned with the opening in the plate and a top opening of the hopper is aligned with a discharge spout on the vehicle. The top opening is larger than the bottom opening.

A device and method for transferring bulk materials from a vehicle through a grate to a structure disposed below the grate in accordance with the present teachings is advantageous relative to conventional devices and methods. In particular, the inventive device and method minimize the generation and escape of dust during transfer of bulk materials from the vehicle through the grate to the structure below the grate.

The foregoing and other aspects, features, details, utilities, and advantages of the disclosed device and method will be apparent from reading the following detailed description and claims, and from reviewing the accompanying drawings illustrating features of the device and method by way of example.

DETAILED DESCRIPTION

Figure 1:
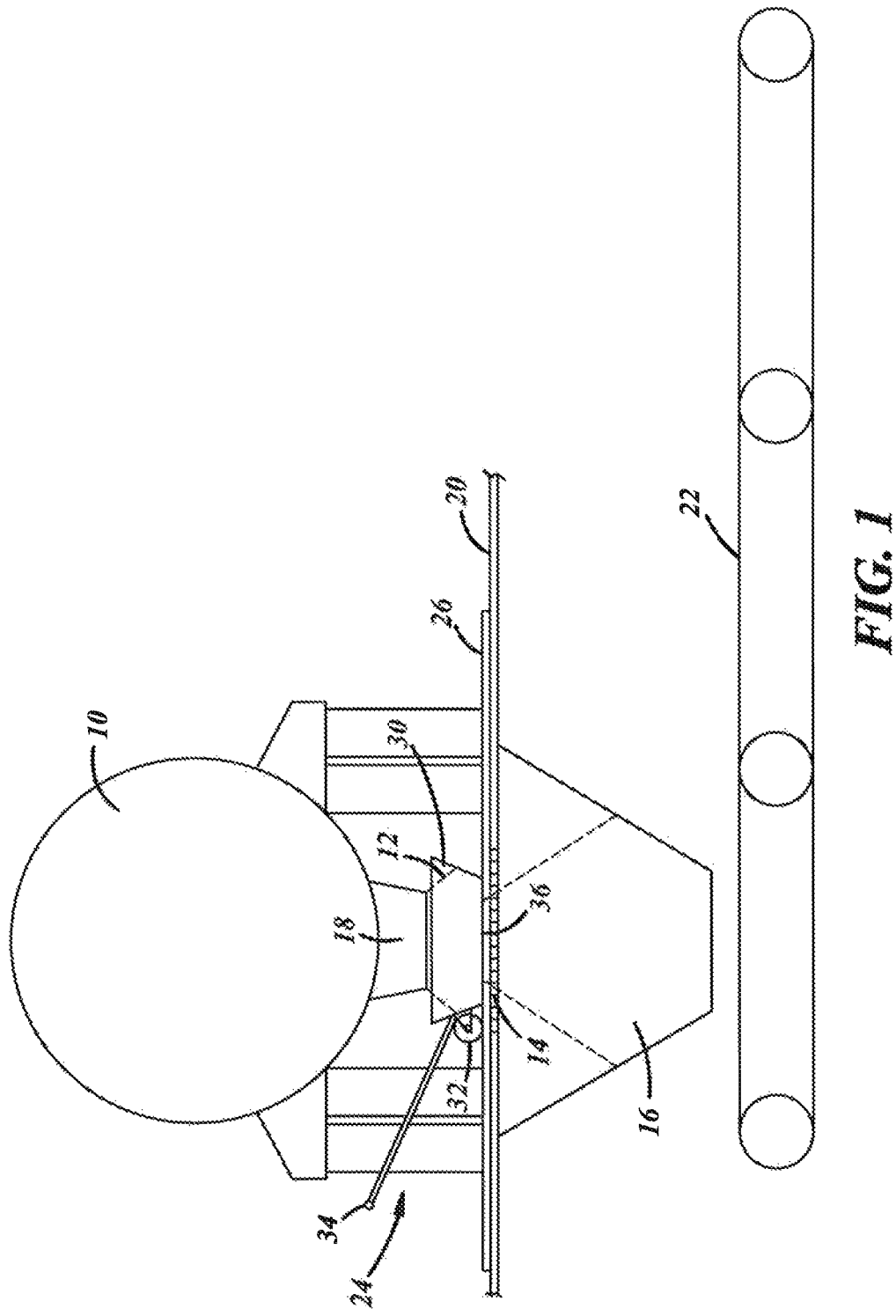
FIG. 1 is a diagrammatic drawing of a device for transferring bulk materials from a vehicle through a grate to a structure below the grate in accordance with one embodiment of the present teachings.

Referring now to the drawings wherein like reference numerals are used to identify identical components in the various views, FIG. 1 illustrates a vehicle 10 in the process of transferring raw materials 12 through a grate 14 to a structure 16 disposed below the grate. The vehicle 10 may comprise a rail car or a tractor and a trailer and the rail car or trailer may be particularly adapted to transport dry goods. The vehicle 10 may include one or more discharge spouts 18 through which bulk materials may exit the vehicle in response to actuation of mechanical or electromechanical valves on the vehicle. The one or more discharge spouts 18 may be disposed in a bottom of the vehicle 10 such that the materials 12 exit the vehicle under the force of gravity. In one embodiment, the materials 12 carried by vehicle 10 may comprise silica sand, soda ash (sodium carbonate), limestone, cullet or similar materials used in glass production. It should be understood, however, that materials 12 may comprise other dry goods including, for example, foodstuffs such as grains. Grate 14 is provided to allow materials 12 to pass through an opening in which grate 14 is disposed and prevent larger objects from passing through the opening. In particular, grate 14 provides a safety function in preventing people and vehicles from falling through the opening. In the illustrated embodiment, grate 14 comprises a floor grate that is disposed within an opening in a floor 20. It should be understood that the term floor as used herein may also describe an exterior ground surface such as a concrete or asphalt drive or roadway or the surface under a rail track. Grate 14 permits materials 12 discharged from vehicle 10 to pass through floor 20 to structure 16. Structure 16 is disposed below floor 20 and may be configured to gather and funnel materials 12 to a predetermined location. In the illustrated embodiment, structure 16 transfers the materials 12 to a conveyor 22. It should be understood, however, that structure 16 may transfer materials 12 to other locations including into a fixed container (such as a silo or storage bin) or another vehicle. As materials 12 exit the one or more discharge spouts 18 on vehicle 10, the materials 12 fall over a distance to grate 14 before striking grate 14 or passing through grate 14 to structure 16. The distance over which materials 12 fall and the presence of grate 14 contribute to generation or dust during the transfer of materials 12 from vehicle 10 to structure 16. In accordance with the present teachings a device 24 is provided to reduce or minimize generation and escape of dust during transfer of materials 12 from vehicle 10 to structure 16.

Device 24 is provided to transfer bulk materials from vehicle 10 through a grate 14 to structure 16. Device 24 may include several components including a plate 26, a cover 28 (shown in FIG. 2), a filter 29 (shown in FIG. 2), a hopper 30 and means, such as wheels 32 and handle 34, means for moving hopper 30 to an operating position between vehicle 10 and plate 26.

Figure 2:
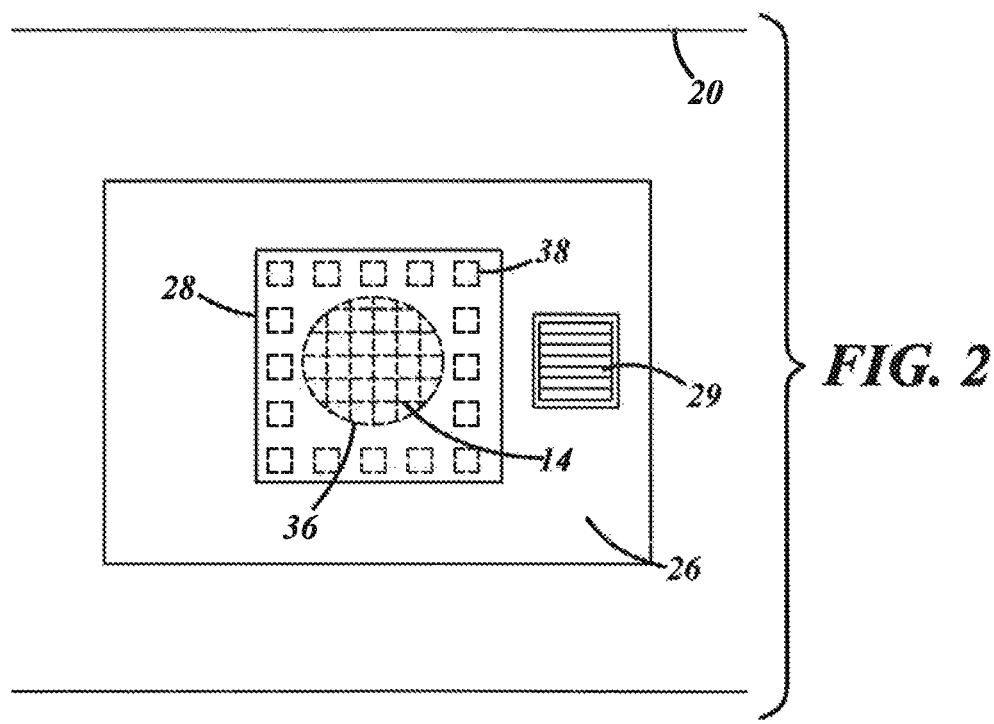
FIG. 2 is a top plan view of a portion of the device of FIG. 1.

Plate 26 is provided to control the size of the material passageway through grate 14. Plate 26 may be made of metals, metal alloys, wood or other materials and is preferably made of materials having sufficient strength to support and distribute the weight of vehicle 10 without substantial deformation or damage to plate 26. Plate 26 is configured to be supported on grate 14 and/or floor 20 and may have a length and width greater than a length and width of grate 14. Plate 26 defines an opening 36 that is smaller in size than grate 14. Referring to FIG. 2, in one embodiment, opening 36 is circular in shape, but opening 36 may be square, rectangular or another shape. Plate 26 may be arranged such that opening 36 is centered relative to grate 14 and/or structure 16 and one or more discharge spouts 18 of vehicle 10. Vehicle 10 may be positioned such that one or more discharge spouts 18 are centered relative to opening 36.

Referring to FIG. 2, an optional cover 28 is provided to cover opening 36 in plate 26 when no material is being transferred through grate 14 in order to prevent dust from passing upward through grate 14 and prevent foreign materials from passing downward through grate 14. Cover 28 may be made from various materials including nylon or other lightweight plastics. Cover 28 is larger in size than opening 36 in plate 26 and is configured to rest on plate 26 and potentially floor 20 if the dimensions of cover 28 are greater than the dimensions of plate 26. Cover 28 may be unsecured relative to plate or cover 28 may be secured to plate 26 in various ways. In one embodiment, cover 28 include magnets 38 that secure cover 28 to plate 26. Magnets 38 may outline a shape that is larger in size than opening 36 such that cover 28 is effective to seal opening 36. In the illustrated embodiment, magnets 38 form the shape of a square. It should be understood, however, that magnets 38 may form a variety of shapes as long as the dimensions of the shape are greater than the dimension of opening 36. For example, in the illustrated embodiment, magnets 38 could alternatively form a circle having a greater diameter than circular opening 36. It should also be understood that magnets 38 could alternatively be replaced by a single magnet having the desired shape.

An optional filter 29 may be provided to filter air displaced during transfer of materials 12 from vehicle 10 through grate 14 to structure 16. In the illustrated embodiment, filter 29 is supported on plate 26—either above or below plate 26 relative to floor 20. In an alternative embodiment, filter 29 may be supported on hopper 30. Filter 29 may overlay a vent formed in plate 26. The vent may include a set of holes formed in plate 26 (e.g., a four by four set (sixteen total) of three inch diameter holes within a square space measuring approximately twenty-four inches by twenty-four inches or any other size and distribution). Filter 29 may comprise a pleated filter or screen measuring approximately thirty inches by thirty inches supported on a support structure overlaying or underlying the holes in plate 26. When filter 29 is supported on top of plate 26, filter 29 is preferably located so as to be between the wheels of vehicle 10 during travel of vehicle 10, but the support structure for the pleated filter or screen should be sufficiently sturdy to allow for wheel travel over the structure. Filter 29 may be made of any appropriate material including metals or plastics (e.g., nylon) with openings less than 0.5 inches to allow discharge of air without allowing dust to escape.

Figure 3:
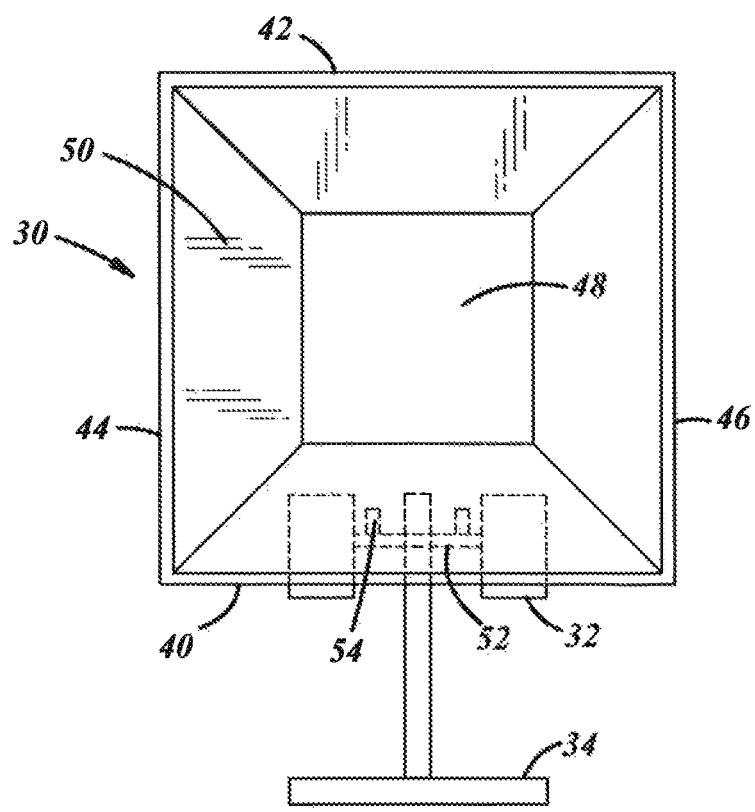
FIG. 3 is a top plan view of another portion of the device of FIG. 1.
Figure 4:
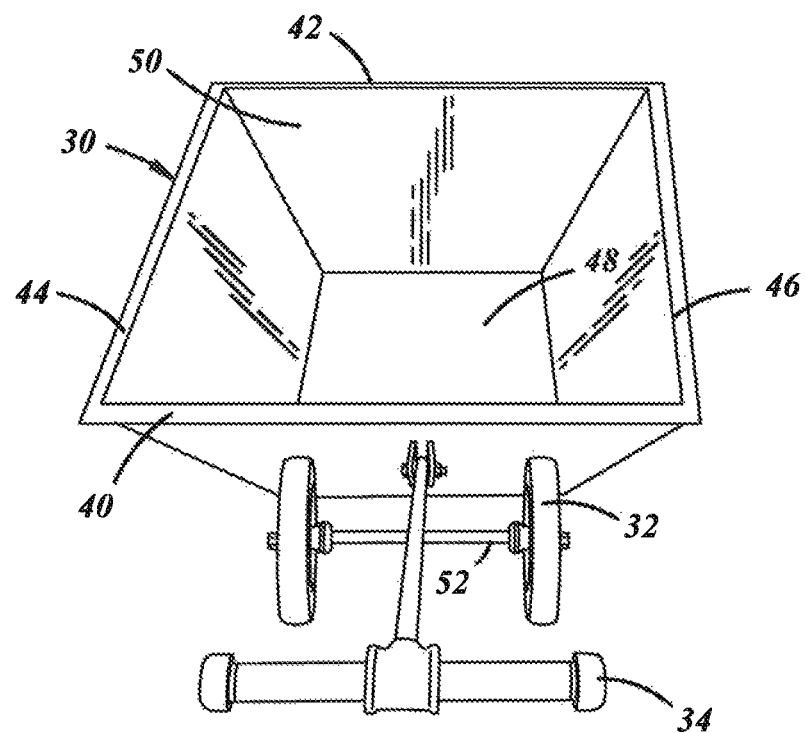
FIGS. 4-5 are perspective views of the portion of the device shown in FIG. 3.
Figure 5:
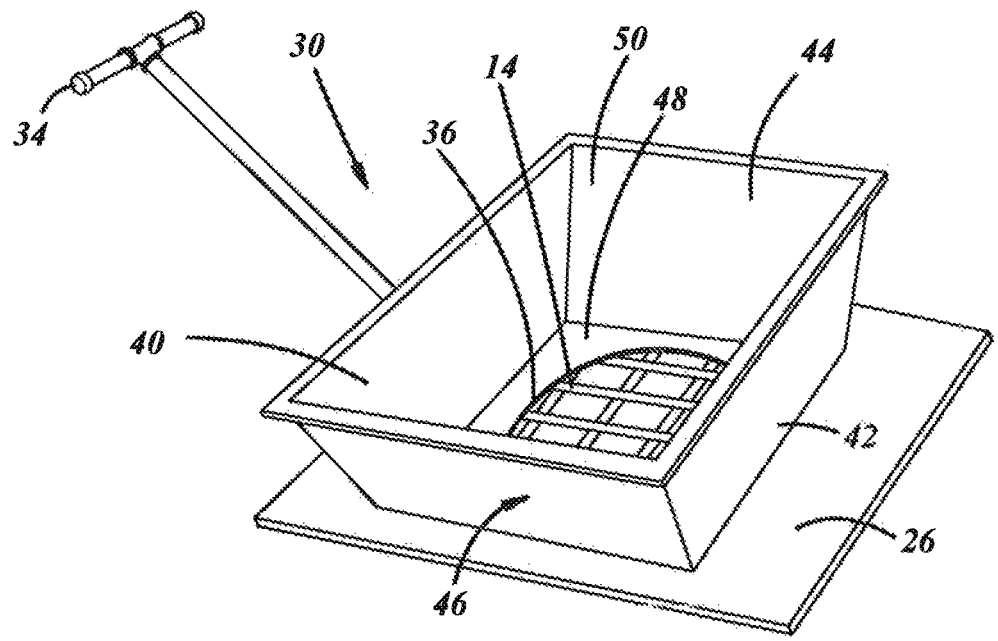

Referring again to FIG. 1, hopper 30 is provided to gather materials 12 exiting one or more discharge spouts 18 of vehicle 10 and to funnel the materials 12 to opening 36 in plate 26. Hopper 30 is configured to rest on plate 26 between plate 26 and the underside of vehicle 10. Hopper 30 tapers from one end proximate one or more discharge spouts 18 to an opposite end proximate plate 26. Referring to FIGS. 3-5, hopper 30 may include four walls 40, 42, 44, 46 with two pairs of opposed walls 40, 42 and 44, 46. Each wall 40, 42, 44, 46 may be substantially trapezoidal in shape and have parallel short and long edges with the shorter edges of walls 40, 42, 44, 46 coupled to one another and disposed proximate plate 26 and the longer edges of walls 40, 42, 44, 46 coupled to one another and disposed distant from plate 26. Walls 40, 42, 44, 46 maintain materials 12 within a predetermined area and allow materials 12 to form a pile within hopper 30 extending from grate 14 to one or more discharge spouts 18. Walls 40, 42, 44, 46 define a bottom opening 48 that is configured for alignment with opening 36 in plate 26 and a top opening 50 that is configured for alignment with one or more discharge spouts 18 on vehicle 10. Bottom opening 48 may be larger than opening 36 in plate 26 such that bottom opening 48 surrounds opening 36 in plate 26. Top opening 50 is larger than bottom opening 48 and may be larger than the perimeter of one or more discharge spouts 18.

Wheels 32 and handle 34 provide a means for moving hopper 30 to an operating position in which the bottom and top openings 48, 50 are aligned with opening 36 in plate 26 and one or more discharge spouts 18 on vehicle 10, respectively. Referring to FIG. 3, wheels 32 may be supported at opposite ends of an axle 52 that is mounted to an external surface of hopper 30. Axle 52 may, for example, be supported by one or more mounting brackets 54 extending from an external surface of one of walls 40, 42, 44, 46. Wheels 32 may be supported for rotation relative to axle 52 by bearings (not shown). Wheels 32 may be mounted to hopper 30 such that the bottom of each wheel 32 is disposed above a plane defined by the bottom of walls 40, 42, 44, 46 of hopper 30 thereby allowing the walls 40, 42, 44, 46 to directly contact base plate 26 and form a seal with base plate 26 when hopper 30 is moved to an operating position between vehicle 10 and plate 26. During transport of hopper 30, handle 34 is used to tilt hopper 30 and bring wheels 32 into contact with a floor or other surface. Handle 34 projects from an external surface of hopper 30. Handle 34 may extend from an external surface of the same wall 40, 42, 44, 46 on which axle 52 is mounted. Handle 34 may be coupled to hopper 30 directly using conventional fasteners such as adhesives or welds or indirectly using conventional fasteners such as screws, pins, or bolts extending through handle 34 and mounting brackets extending from hopper 30. Handle 34 may be fixed in position relative to hopper 30 or may be adjustable relative to hopper 30 along one or more dimensions (e.g., through use of a telescoping handle to adjust length or through a universal joint to allow changes in angle relative to hopper 30).

Referring again to FIG. 1, a method for transferring raw materials from vehicle 10 through grate 14 to structure 16 may begin with the step of arranging plate 26 over grate 14. Opening 36 in plate 26 is smaller than grate 14 and therefore constrains the amount of raw materials 12 that may be passed through grate 14 at any given time. Opening 36 in plate 26 constrains the lateral area of the floor over which raw materials 12 may disperse and spread when being discharged from vehicle 10. Referring to FIG. 2, the method may continue with the step of removing cover 28 if cover 28 is used to cover opening 36 in plate 26. Referring again to FIG. 1, once a vehicle 10 has been positioned over opening 36 and plate 26 and one or more discharge spouts 18 on vehicle 10 aligned with opening 36, the method may continue with the step of moving hopper 30 to an operating position between plate 26 and vehicle 10. Hopper 30 may be moved by an operator using handle 34 to exert a force on hopper 30 to move hopper 30 into and out of the operating position between vehicle 10 and plate 26. When in the operating position, bottom opening 48 of hopper 30 is aligned with opening 36 in plate 26 and top opening 50 of hopper 30 is aligned with one or more discharge spouts 18 on vehicle 10. At this point, materials 12 may be released from one or more discharge spouts 18. The materials 12 fall through hopper 30 and exit bottom opening 48. The materials 12 then pass through opening 36 in plate 26 and grate 14 to structure 16. Hopper 30 guides the materials 12 to opening 36 in plate 26 and grate 14 and creates a venturi effect that maintains dust within hopper 30 when the first materials 12 enter hopper 30. Dust generated as materials 12 enter structure 16 is prevented from escape by plate 26 and the material passing through opening 36 in plate 26 and grate 14. Eventually, materials 12 may begin to back up within hopper 30 because structure 16 and downstream equipment such as conveyor 22 are limited in the amount of materials 12 which can be handled over any given period of time. The materials 12 may form a pile within hopper 30 (top opening 50 should be large enough to accommodate the angle of repose of the pile of materials 12) and eventually back up to the one or more discharge spouts 18 thereby reducing or preventing dust release that typically results from conventional systems where materials 12 are dropped from vehicle 10 to grate 14 over a distance.

A device 24 and method for transferring bulk materials 12 from a vehicle 10 through a grate 14 to a structure 16 disposed below the grate 14 in accordance with the present teachings is advantageous relative to conventional systems. In particular, the inventive device 24 and method reduce or prevent generation of dust during transfer of the material by reducing the escape of dust from structure 16 and reducing the dust generated as materials 12 fall from vehicle 10 and impacts grate 14.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

What is claimed is:

1. A device for transferring bulk materials from a vehicle through a flat grate to a structure disposed below the grate, comprising:
    a flat plate configured to be disposed over the grate and including a lower surface configured to be disposed over the grate, an upper surface, and a perimeter surface extending between the lower and upper surfaces and defining an opening smaller than the grate;
    a hopper configured to rest on the upper surface of the plate between the plate and the underside of the vehicle, the hopper defining a bottom opening configured for alignment with the opening in the plate and a top opening configured for alignment with a discharge spout on the vehicle, the top opening larger than the bottom opening; and,
    means for moving the hopper to an operating position in which the bottom and top openings are aligned with the opening in the plate and the discharge spout on the vehicle.

2. The device of claim 1 wherein the grate comprises a floor grate and wherein the plate is configured to have a length and width greater than that of the floor grate and greater than a distance between the lower and upper surfaces of the plate.

3. The device of claim 1 wherein the opening in the plate is circular.

4. The device of claim 1 wherein the bottom opening in the hopper is larger than the opening in the plate.

5. The device of claim 1, further comprising a filter supported on the upper surface of the plate and configured to filter air displaced by transfer of the bulk materials from the vehicle to the structure.

6. The device of claim 1 wherein the top opening in the hopper is larger than a perimeter of the discharge spout on the vehicle.

7. The device of claim 1 wherein the hopper includes four side walls, each of the four side walls having a substantially trapezoidal shape.

8. The device of claim 1 wherein the moving means includes:
    a handle projecting from an external surface of the hopper;
    an axle mounted to the external surface of the hopper; and,
    first and second wheels disposed at opposite ends of the axle.

9. The device of claim 8 wherein the handle projects from a first wall of the hopper and the axle is mounted on the first wall of the hopper.

10. A device for transferring bulk materials from a vehicle through a grate to a structure disposed below the grate, comprising:
    a plate disposed over the grate and defining an opening smaller than the grate;
    a hopper configured to rest on the plate between the plate and the underside of the vehicle, the hopper defining a bottom opening configured for alignment with the opening in the plate and a top opening configured for alignment with a discharge spout on the vehicle, the top opening larger than the bottom opening;
    means for moving the hopper to an operating position in which the bottom and top openings are aligned with the opening in the plate and the discharge spout on the vehicle; and a cover having a plurality of magnets that outline a shape larger in size than the opening in the plate, the cover configured to seal the opening in the plate when the device is not in use.

11. A method for transferring bulk materials from a vehicle through a flat grate to a structure disposed below the grate, comprising the steps of:
arranging a flat plate over the grate, the plate including a lower surface configured to be disposed over the grate, an upper surface, and a perimeter surface extending between the lower and upper surfaces and defining an opening smaller than the grate; and,
moving a hopper, via a means for moving the hopper, to an operating position between the plate and the vehicle, after the vehicle is located over the grate, in which the hopper is disposed on the upper surface of the plate, a bottom opening of the hopper is aligned with the opening in the plate and a top opening of the hopper is aligned with a discharge spout on the vehicle and wherein the top opening is larger than the bottom opening.

12. The method of claim 11 wherein the grate comprises a floor grate.

13. The method of claim 11 wherein the opening in the plate is circular.

14. The method of claim 11 wherein the bottom opening in the hopper is larger than the opening in the plate.

15. The method of claim 11 wherein a filter is supported on the upper surface of the plate and configured to filter air displaced by transfer of the bulk materials from the vehicle to the structure.

16. The method of claim 11 wherein the top opening in the hopper is larger than the perimeter of the discharge spout on the vehicle.

17. The method of claim 11 wherein the hopper includes four side walls, each of the four side walls having a substantially trapezoidal shape.

18. The method of claim 11 wherein a handle projects from an external surface of the hopper, an axle is mounted to the external surface of the hopper and first and second wheels are disposed at opposite ends of the axle.

19. The method of claim 18 wherein the handle projects from a first wall of the hopper and the axle is mounted on the first wall of the hopper.

20. The method of claim 11, further comprising the step of removing, prior to said moving step, a cover covering said opening in the plate, the cover having a plurality of magnets that outline a shape larger in size than the opening in the plate.

21. In combination, the device of claim 1 and the grate recited in claim 1 wherein the plate is disposed over the grate.

* * * * *